US006761265B1

(12) United States Patent
Dolan et al.

(10) Patent No.: US 6,761,265 B1
(45) Date of Patent: Jul. 13, 2004

(54) FLEXIBLE CONVEYOR TRACK SECTION

(75) Inventors: Michael S. Dolan, Denver, CO (US); Robert E. Nissen, Evergreen, CO (US); Robert D. Nusz, Windson, CO (US)

(73) Assignee: Serpentix Conveyor Corp., Westminster, CO (US)

( * ) Notice: Subject to any disclaimer, the term of this patent is extended or adjusted under 35 U.S.C. 154(b) by 2 days.

(21) Appl. No.: 10/248,202

(22) Filed: Dec. 26, 2002

(51) Int. Cl.[7] .............................................. B65G 21/00
(52) U.S. Cl. .............................. 198/861.2; 198/861.1
(58) Field of Search .......................... 198/860.1, 860.2, 198/861.1, 861.2, 735.6

(56) References Cited

U.S. PATENT DOCUMENTS

| | | | | |
|---|---|---|---|---|
| 3,707,218 A | | 12/1972 | Payne et al. | 198/838 |
| 4,144,965 A | | 3/1979 | Alldredge et al. | 198/838 |
| 4,727,981 A | * | 3/1988 | Johansson | 198/861.2 |
| 4,927,006 A | | 5/1990 | Dolan | 198/822 |
| 5,101,734 A | * | 4/1992 | Sakai | 198/861.2 |
| 5,186,314 A | * | 2/1993 | Clopton | 198/860.2 |
| 5,188,035 A | * | 2/1993 | Hideyuki | 198/861.2 |
| 6,223,890 B1 | * | 5/2001 | Blankemeyer et al. | 198/861.2 |

* cited by examiner

*Primary Examiner*—James R. Bidwell
(74) *Attorney, Agent, or Firm*—Kyle W. Rost

(57) ABSTRACT

A plurality of I-beam segments is aligned end-to-end in a longitudinal series. An elongated flexible sheet is carried on each side of the aligned I-beam webs. A flexible lap plate interconnects juxtaposed pairs of I-beam webs and maintains the elongated sheets in a slidable relationship, such that the flexible sheets can move with respect to the webs when the track section flexes laterally.

9 Claims, 5 Drawing Sheets

10 14 42 38 34 36 3 30 48 32 42 32 3 46 12

FLEXIBLE CONVEYOR TRACK SECTION

BACKGROUND OF INVENTION

1. Field of the Invention

The invention generally relates to power driven conveyors. More specifically, the invention relates to a conveyor section of an endless conveyor and to the support, guide, or hold-down means for a carrier belt, especially to a laterally pivotable support for the belt. Another specific aspect of the invention is a conveyor frame that is adjustable, such that the frame flexes or pivots intermediate its ends to move one end relative to the other.

2. Description of Prior Art

In the conveyor industry, the belt conveyor is a basic format. Often such a conveyor provides an endless flat belt carried on a train of rollers. One or more powered rollers drive and support the belt, while idler rollers provide additional support along the length of the conveyor run. This type of conveyor is limited in its uses because the format is not readily adapted to a non-linear path.

An improved type of conveyor belt is capable of following a vertically and horizontally curved path and is available in the United States under the Serpentix trademark, by the Serpentix Conveyor Corporation of Westminster, Colo. This type of belt is characterized by a dished and convoluted, flexible structure. Such a belt can travel around a lateral curve, as well as up, down, or straight, allowing a single belt to carry a load over, under, or around obstacles and through changes in direction. Linear belt conveyors cannot perform these functions with only a single belt. Instead, the load must be transferred to a second linear belt positioned at an angle to the first.

A variety of constructions compliment the improved features of a convoluted belt. U.S. Pat. No. 3,707,218 to Payne et al. shows a conveyor track in which an upper run and a lower run each are defined by two widely spaced, channel-shaped rails. This type of conveyor may be called a multi-rail conveyor. Each rail can be constructed of many small segments so that it can be variably curved. However, each segment must be supported in its location within the overall rail. For this purpose, a transverse joining plate joins each segment of one rail to a similarly positioned segment of each of the other rails; and all of the joining plates are carried on an elongated, resilient, central rod, which gains its external support from legs or other braces. A problem with this structure is that it provides only weak lateral support to the rails and can permit the belt to tip while rounding a curve.

U.S. Pat. No. 4,144,965 to Alldredge et al. shows a similar multi-rail conveyor, but with an improved conveyor track structure in which the joining plates not only are strung on a central rod, but also are strung on resilient rods located near each lateral edge to implement improved lateral stability. The curve is temporarily fixed by mechanically adjusting the effective length of the laterally separated rods. The multi-rail tracks of the Alldredge and Payne patents are heavy duty and difficult to fabricate.

U.S. Pat. No. 4,927,006 to Dolan discloses a conveyor track supporting a single, centerline slide channel suited to carry the same type of dished, convoluted, flexible belt. This type of conveyor may be referred to as a centerline conveyor. The belt is supported at its center over a single, centerline chain that both pulls the belt and supports the load. The chain operates within an elongated centerline track composed of a channel that is closed on three sides and has a pair of side flanges partially closing its fourth side, leaving only a central slot for passage of a joiner between the chain and the belt. If the belt tilts, the tilting is limited when the joiners or chain links become laterally displaced or twisted sufficiently that they contact the channel walls or slot flanges. Thus, the fit between the chain, joiners, and channel determines how much tilting is permitted. The centerline design often uses a plastic liner within the channel, providing a low friction slide surface for contact with the chain. The chain may carry attached plastic sliders for low friction contact with the channel. In addition, the chain may carry lateral extensions to improve its stability against lateral tilting.

A centerline conveyor offers advantages of easier fabrication and typically lower manufacturing cost than a multi-rail conveyor, as described above. It would be desirable to develop a suitable flexible track for a centerline conveyor, but this has proven to be difficult. An elongated centerline channel can be divided into segments, much as done with the rails of a multi-rail conveyor. However, the central positioning of the channel and of its underlying support structure provides little ability to control the arc of the curve. Although the dished, convoluted belt used in these conveyors can bend around a corner, too sharp of a bend will shorten belt life and can produce buckling and sagging.

Extreme measures such as adding widely spaced lateral supports and control rods to a centerline conveyor track might solve the arc control problem, just as achieved in the above Alldredge patent. However, these additions would add significant complexity and cost to the overall design of the conveyor track.

It would be desirable to provide arc control to the track of a centerline conveyor without returning to the multi-rail design.

More specifically, it would be desirable to provide arc control in a flexible centerline conveyor while maintaining the efficient structure for which such centerline conveyors are known.

To achieve the foregoing and other objects and in accordance with the purpose of the present invention, as embodied and broadly described herein, the invention may comprise the following.

SUMMARY OF INVENTION

Against the described background, it is therefore a general object of the invention to provide an improved conveyor track section that can be flexed laterally while the conveyor remains in operation.

Another object is to provide a flexible track structure suited to carry a conveyor belt through variable lateral curves.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

According to the invention, a laterally flexible and longitudinally elongated conveyor track is suited for use with conveyor belt that is capable of lateral bending. A portion of the conveyor track is formed of a plurality of rigid beam segments aligned end-to-end in a series. This track portion is laterally flexible. Each beam segment is formed of an approximately vertical web of predetermined height and a flange that is connected to an upper portion of the web. An elongated plate or strip of flexible and resilient sheet material extends longitudinally along the series of beam segments on at least one side of the aligned webs. A flexible lap plate interconnects at least two juxtaposed beam segments. The lap plate also engages the elongated, flexible sheet by a structure suited for permitting the elongated sheet to move longitudinally with respect to the webs while retaining the elongated sheet. The elongated sheet is permitted to move longitudinally as the conveyor track flexes laterally.

The accompanying drawings, which are incorporated in and form a part of the specification illustrate preferred embodiments of the present invention, and together with the description, serve to explain the principles of the invention. In the drawings:

DETAILED DESCRIPTION

The present invention is directed to an improved centerline conveyor of type employing a flexible, convoluted, troughed belt that is capable of bending laterally. Belts of this type are known in the art and are shown and described in published patents such as U.S. Pat. No. 4,144,965 to Alldredge et al. Centerline conveyors are shown and described in published patents such as U.S. Pat. No. 4,927,006 to Dolan. The disclosures of these two patents are incorporated by reference for these teachings.

Figure 1:
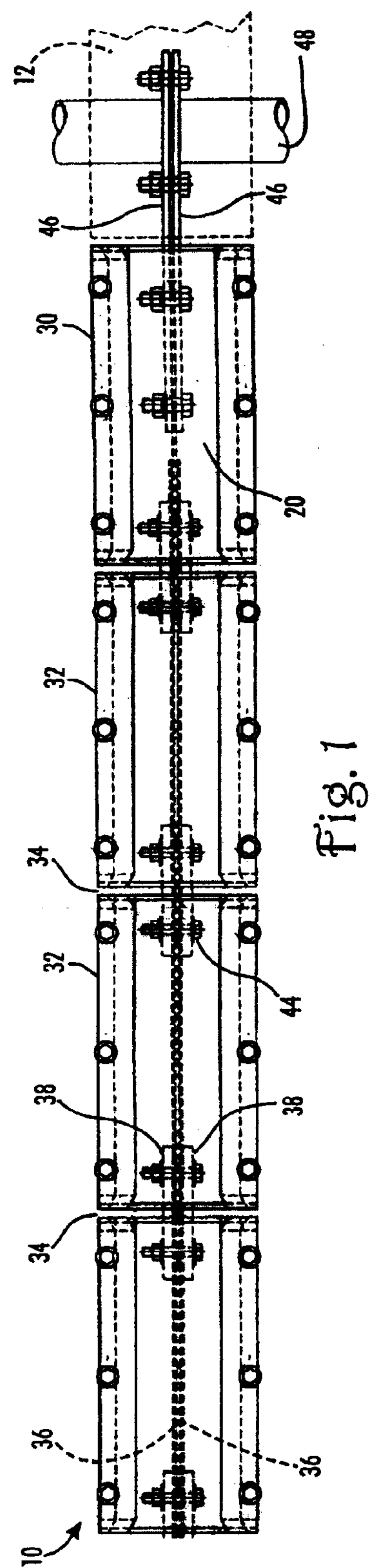
FIG. 1 is a top plan view of a flexible conveyor track section, showing a central web and flexible sheet structure in phantom and also showing an end section partially broken away and in phantom.
Figure 4:
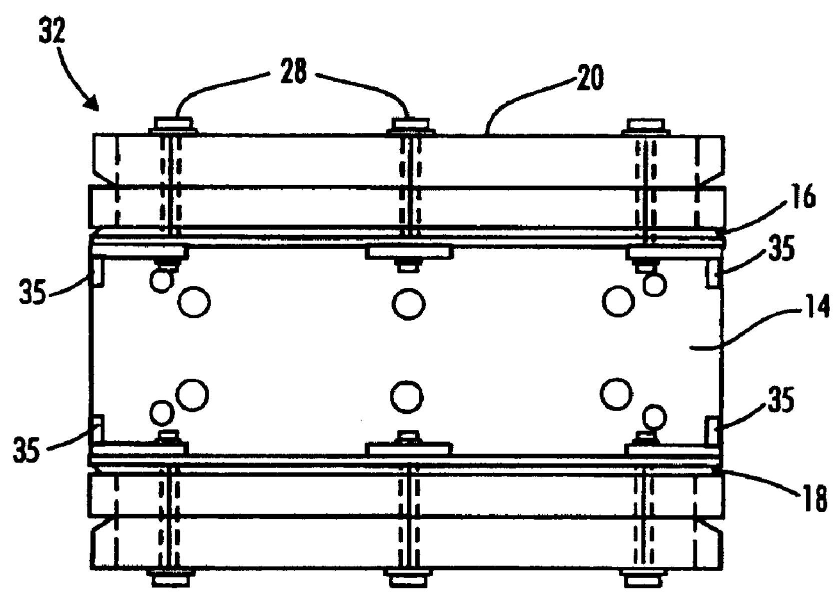
FIG. 4 is a side elevation view of a single short I-beam section, showing end stops and also showing a suitable standard hole pattern in the web for attaching various lap plates.
Figure 5:
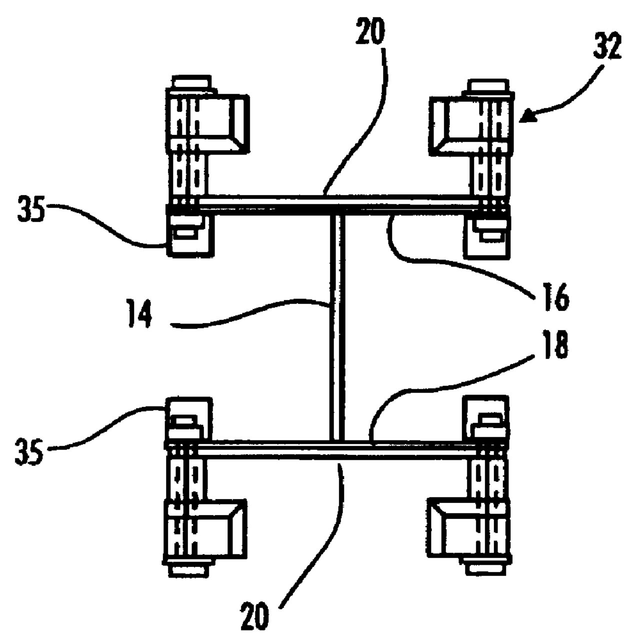
FIG. 5 is an end elevation view of the I-beam section of FIG. 4.

With reference to FIG. 1, the invention is a centerline conveyor track assembly 10 or a portion thereof that is laterally flexible. The conveyor track assembly employs conventional elements such as a structural support capable of defining a longitudinal pathway with first and second ends. The support is suited to carry a conveyor belt and its load along the pathway. Conventionally, such a structural support may be a single, longitudinally continuous I-beam, but the support of FIGS. 1 and 2 employs an aligned series of short segments 32 of I-beam. A typical single I-beam segment 32 is shown in FIGS. 4 and 5, and is formed of a central, usually vertical web 14 with a perpendicular, usually horizontal top flange 16 connected to the web near the top of the web. In an I-beam structure, a similar, usually horizontal bottom flange 18 is connected to the web near the bottom of the web. A typical, suitable height for a web is 4.25 inches, and a typical, suitable width for a flange is 6 inches.

The series of I-beam segments 32 is modified at each end of the conveyor track assembly to carry an end section or drive station 12 that may carry an end sprocket that engages a conveyor chain. At least one of the end sprockets is driven by a motor and constitutes a drive station.

The top flange 16 supports a longitudinally elongated containment channel 20 on its face opposite from the web. The channel 20 is suited to receive within it a pulling chain for an endless conveyor belt of the type described, above. Top flange 16 defines the path of the top run of the conveyor belt. The bottom flange 18 carries a similar channel 20 on its face opposite from the web. Bottom flange 18 defines the path of the return run of the conveyor belt.

The channel 20 may be formed of a strong, low-friction, material. The channel provides a base wall 22 extending longitudinally along a top flange 16 or bottom flange 18. A pair of sidewalls 24 extends longitudinally along the opposite sides of the base wall 22. A pair of inwardly directed flanges 26 partially closes an open face of the channel opposite from the base. These channel components may be fastened to flanges 16, 18 of an I-beam by suitable fasteners such as bolts 28. The channel is configured to receive a conveyor chain within it. The chain may be of the type shown in U.S. Pat. No. 4,927,006 to Dolan. The channel flanges 26 are spaced apart to define a slot between them. The slot provides a longitudinal passageway for receiving a connector between a conveyor chain located within the channel and a conveyor belt located outside the channel.

According to conventional practice, the top run of a conveyor track assembly is the operational run. A portion of an endless conveyor belt travels over the operational run above the channel 20 in upright position, from a first end section 12 to a second and opposite end section 12 of the operational run. The second end section 12, illustrated in phantom in FIGS. 1 and 2, may be regarded as the discharge end, where any load carried on the belt will discharge by gravity as the belt passes around a second end sprocket to the return run. The belt passes to the under side of the conveyor track assembly in an inverted position for travel through the return run from the second end sprocket to the first end sprocket. At the first end sprocket, the endless belt returns to the top side of the track assembly in upright position.

The invention provides a flexible track assembly 10 that often constitutes a portion of a relatively longer conveyor track assembly. When only a portion of the conveyor track assembly is made flexible, typically this will be near the second end of the conveyor track assembly to allow variability in discharge locations.

The flexible track assembly is made laterally deformable by forming the support beam of a plurality of discrete, relatively short beams or beam segments 32, each shorter in length than the total flexible track assembly. Three or more short beams 32 may define a flexible track assembly. A typical flexible track assembly 10 may be formed of approximately eight short beams 32. The short beams 32 are longitudinally aligned, end-to-end, to define the laterally deformable length of the conveyor track assembly 10. The short I-beam segments 32 are spaced apart when aligned in a straight path, with a spacing or track pivot gap 34 left between each pair of juxtaposed beam segments. A suitable length for a short I-beam may be one foot, and a typical track pivot gap may be 5/16 inch.

The pivot gap 34 provides room for lateral deformation between an end of each short segment 32 and the opposed end of its neighboring segment. The top and bottom flanges 16, 18 of a short I-beam 32 may be configured to allow a predetermined angle or arc between segments before the flanges of neighboring segments contact each other. As best shown in FIGS. 4 and 5, the ends of each flange may carry stops 35 attached to the flanges near the lateral ends of facing edges, where the ends of the flanges could strike one another when the conveyor track is flexed.

The flexible track assembly is made flexible by attaching at least one elongated plate or sheet 36 of strong, flexible, resilient sheet material along the side of the aligned webs 14. At least one sheet 36 may be applied on each side of the webs 14, thus locating the webs 14 of a plurality of the short beams 32 between the longitudinally elongated sheets 36.

In FIG. 1, the elongated sheets 36 are shown in phantom on each side of a central web. The sheets 36 may be composed of strong, flexible, resilient sheet material such as spring steel. The resilient sheets 36 are arranged with at least one sheet and preferably two sheets 36 on each side of the aligned webs 14.

Figure 2:
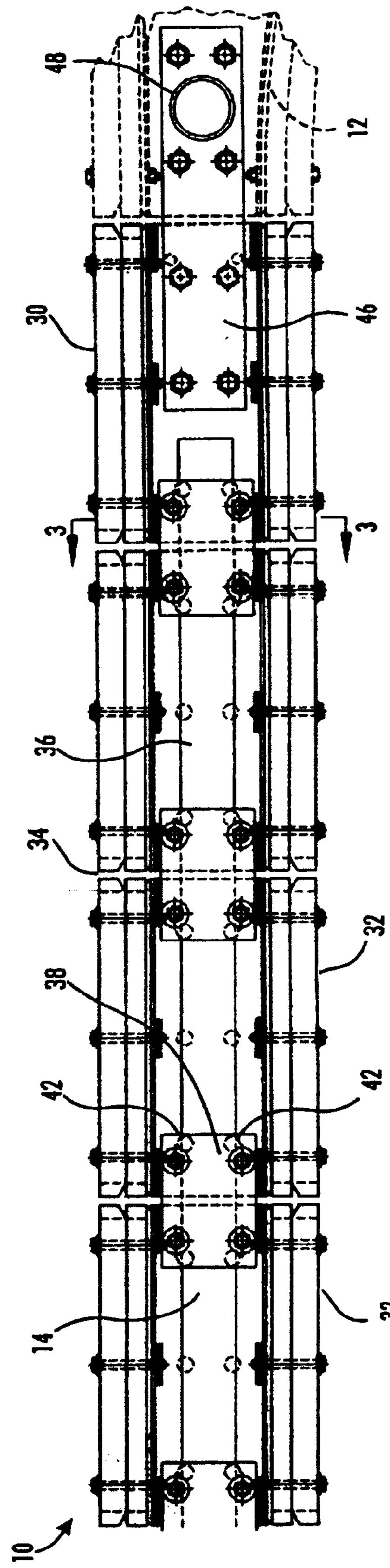
FIG. 2 is a side elevation view thereof.

As best shown in FIG. 2, a convenient length for the resilient sheets 36 is at least greater than the length of the total number of short beams 32 minus two. With at least this length, each resilient sheet is capable of overlapping all of the short I-beams 32 with the exception of the ultimate short I-beam 32, identified by the number 30 in FIGS. 1 and 2, at each of the opposite ends of the flexible track assembly. However, the resilient sheets are long enough to at least partially overlap each of the ultimate end short I-beams 30.

Figure 3:
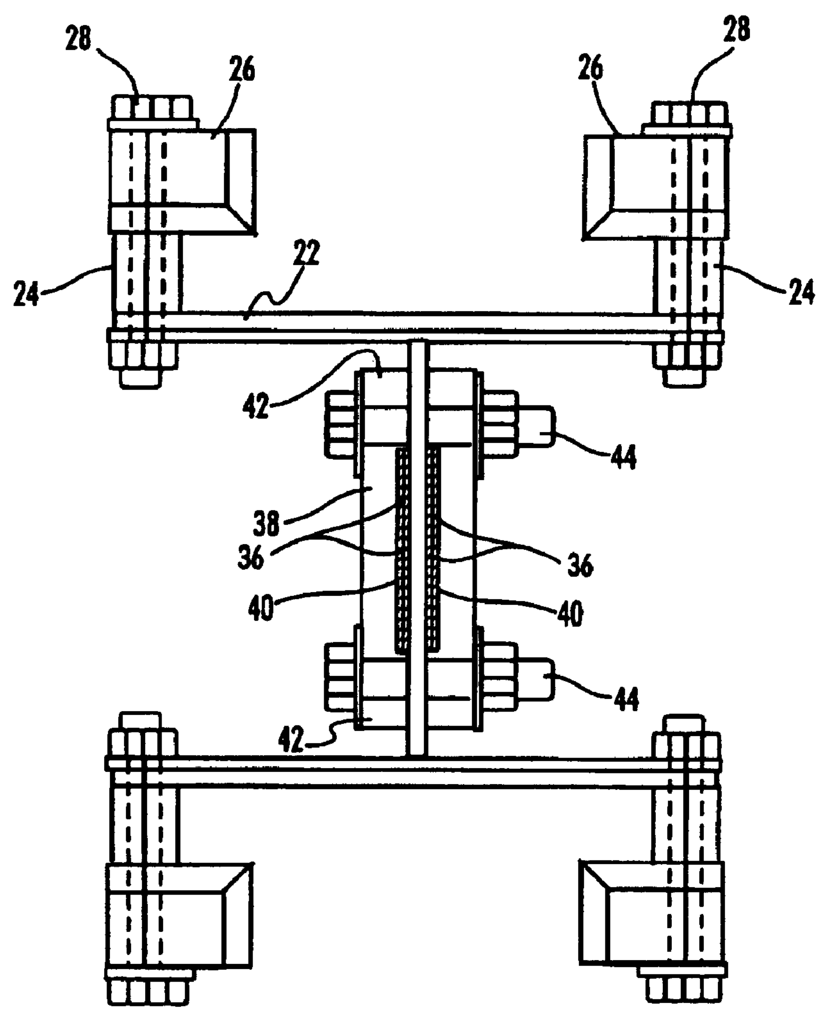
FIG. 3 is a transverse cross section thereof taken on the plane of line 3—3 of FIG. 2.

The resilient sheets 36 are held in place near or against webs 14 by a means for allowing the sheets to move longitudinally with respect to the webs when the track section 10 is flexed. A flexible lap plate or splice plate 38 joins juxtaposed beam segments 32 over a track pivot gap 34. The lap plate is joined to each of the short I-beams 32 that define the gap 34. Together with a web, the lap plate 38 defines a peripherally closed through passage that receives a sheet 36. The flexible plate 38 may define a longitudinal groove 40 in its surface facing the webs for receiving the sheet therein. Thus, a flexible lap plate 38 overlies at least one resilient sheet 36 and receives the sheet in longitudinal groove 40. The size of groove 40 is selected to allow a clearance with respect to the height and thickness of a sheet 36, or a plurality of sheets 36 where more than one is used. This clearance allows the resilient sheet to move longitudinally with respect to the flexible lap plate 38. FIG. 3 shows the preferred arrangement in which a set of two lap plates 38 on opposite sides of the conveyor track are bolted together in common by bolts 44, and two flexible sheets 36 are engaged within the groove 40 of each lap plate 38.

Each resilient sheet is of a predetermined height that is shorter than the height of a web 14. The shorter height of the resilient sheet allows a residual spacing between the I-beam flanges 16, 18 and the nearer edge of a sheet 36. The residual spacing is sufficient to allow each lap plate 38 to have headers or other fastening areas 42 both above and below groove 40. Fasteners such as bolts 44 pass through the fastening areas 42 and web 14 to attach the flexible splice plates 38 to the beam web. The depth of longitudinal groove 40 provides a clearance that allows sheet 36 to move longitudinally even when fastening areas 42 are secured against a web 14.

Multiple layers of spring steel sheets 36 may be applied to each side of webs 14. Two layers of such sheets on each side are preferred, as shown in FIG. 3. The depth of groove 40 is made sufficient to accommodate the selected number of sheets with a suitable clearance. The lap plates 38 on each side of a gap 34 are directly opposite each other and can be secured to the juxtaposed webs by a shared set of four bolts 44. The lap plates 38 and the sheets 36 support the short beam segments 32 in vertical alignment and allow lateral bending.

The short I-beams 30 at each opposite end of a flexible track assembly are attached to remaining parts of the conveyor track assembly. The remaining parts, such as an end section 12, may be considered non-flexible track sections. These non-flexible portions 12 can include any length of continuous I-beam. An end section 12 may carry a drive station that includes a powered end sprocket at one end of the conveyor track assembly. Another non-flexible I-beam end section 12 may carry a non-powered end sprocket at the opposite end of the track assembly from the drive station.

A pair of terminal lap plates 46 attaches the ultimate short I-beam 30 at an end of a flexible track assembly to an I-beam 12 of a non-flexible track assembly. The terminal lap plates 46 overlap the webs of the two I-beams on opposite sides. Typically, a terminal lap plate 46 is thicker and less flexible than a spring steel sheet 36. Conveniently, the spring steel sheets 36 may terminate short of the terminal lap plate 46. Although the resilient sheets 36 are in a longitudinally moveable relationship to the short I-beams 30, 32, the relatively thicker terminal lap plates 46 at the ends of the flexible track assembly 10 serve as stops. Thus, the resilient sheets are limited in their longitudinal movement from exiting the groove 44 of any flexible lap plate 38.

As shown in FIGS. 1 and 2, a terminal lap plate 46 may carry a track mount 48 for supporting and moving the conveyor track assembly. Attached suitable supports may include stationary legs or other brackets at a first end of the flexible track assembly. At the second end, which often is the discharge end and includes the drive station, brackets may be used for swinging the discharge end of the conveyor. For example, a motorized mechanism may move the mount 48 at the discharge end of the conveyor to shift the discharge point. The flexible track assembly 10 may be laterally moved freely while the conveyor continues its operation.

FIG. 3 shows a standard pattern of bolt holes in the web of a beam section 32 that enables such a beam section to be used at any position in a flexible track section, as a section 32 or as a section 30.

In operation, applying a lateral force to one end of the track can laterally pivot the flexible track assembly 10. For example, a mount 48 attached to a drive station 12 at an end of a flexible track assembly 10 can shift the discharge point of the conveyor belt.

The flexible track assembly 10 allows a series of short, structural support segments 32 to form an arc. The degree of the arc is limited by the geometry of the support segments 32 and available space 43 between segments. The outer edges of the top and bottom flanges 16, 18 strike each other when the segments have formed the maximum allowable arc, thus preventing excessive bending. FIGS. 4 and 5 show the placement of pivot stops 35 that are located on the flanges to limit the arc.

The short segments 30, 32 are held in vertical alignment by the flexible lap plates 38. The flexibility of lap plates 38 cooperates with the flexibility of the elongated steel sheets 36 to allow lateral bending or flexing.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

What is claimed is:

1. A laterally flexible and longitudinally elongated conveyor track suited for use with a conveyor belt capable of lateral bending, comprising:

a plurality of beam segments, each formed of an approximately vertical web of predetermined height and a top flange attached to an upper portion of said web and forming a supporting surface for the conveyor belt, wherein the webs are aligned end-to-end in a longitudinal series;

an elongated sheet of flexible and resilient sheet material extending longitudinally along the aligned series of webs on at least one longitudinally extending side of the webs;

a flexible lap plate interconnecting at least two juxtaposed webs and engaging said elongated sheet by means for permitting the elongated sheet to move longitudinally with respect to the juxtaposed webs, whereby the elongated sheet is moveable longitudinally with respect to the juxtaposed webs when the conveyor track is flexed laterally.

2. The conveyor track of claim 1, further comprising:

at least two of said elongated sheets of flexible and resilient sheet material, wherein a different one of the at least two sheets is located on each of the opposite longitudinally extending sides of said aligned webs.

3. The conveyor track of claim 1, further comprising:

at least four of said elongated sheets of flexible and resilient sheet material, wherein a different two of the at least four sheets is located on each of the opposite longitudinally extending sides of said aligned webs.

4. The conveyor track of claim 1, wherein said sheet of sheet material comprises spring steel.

5. The conveyor track of claim 1, comprising at least two of said lap plates, wherein a different one of the at least two lap plates is located on each of the opposite sides of said juxtaposed webs.

6. The conveyor track of claim 1, comprising:

at least two of said lap plates, wherein a different one of the at least two lap plates is located on each of the opposite sides of said juxtaposed webs; and at least two of said elongated sheets of flexible and resilient sheet material, wherein a different one of the at least two sheets is located on each of the opposite longitudinally extending sides of said aligned webs.

7. The conveyor track of claim 1, wherein:

each of said plurality of beam segments comprises an I-beam wherein said top flange extends laterally to both sides of the web;

when aligned along a straight line, juxtaposed I-beams are spaced apart by a pivot gap; and further comprising:

a pivot stop attached to the top flanges of juxtaposed I-beams ends in position to strike one another when the conveyor track is laterally flexed through a preselected arc, thereby limiting additional lateral flexing.

8. The conveyor track of claim 1, wherein said means for permitting the elongated sheet to move longitudinally with respect to the juxtaposed webs comprises:

a longitudinal groove in said lap plate, facing said webs, of a height greater than the height of the elongated sheet, of a depth greater than the thickness of the elongated sheet, whereby the elongated sheet is longitudinally moveable in said groove.

9. The conveyor track of claim 1, wherein each of said plurality of beam segments further comprises a longitudinal conveyor chain containment channel segment mounted on said top flange of the beam segment.

* * * * *